Sept. 25, 1923.

W. E. ERNST 1,468,689

THERMOSTATICALLY CONTROLLED THROTTLING DEVICE

Filed Feb. 9, 1922

Inventor:
Wilhelm Eberhard Ernst
By
Attorney

Patented Sept. 25, 1923.

1,468,689

UNITED STATES PATENT OFFICE.

WILHELM EBERHARD ERNST, OF BERLIN-SCHONEBERG, GERMANY.

THERMOSTATICALLY-CONTROLLED THROTTLING DEVICE.

Application filed February 9, 1922. Serial No. 535,262.

*To all whom it may concern:*

Be it known that I, WILHELM EBERHARD ERNST, engineer, citizen of German Republic, residing at Berlin-Schoneberg, in the State of Prussia, Germany, have invented certain new and useful Improvements in a Thermostatically-Controlled Throttling Device, of which the following is a specification.

Attempts have been made to make use of thermostatically controlled throttling members in conduits for fluids for the purpose of regulating the amount of fluid passing through the same, but the forms of construction of the throttling members as hitherto devised proved insufficient for the purpose in view.

Thermostats capable of directly and sensitively responding to variations of temperature did not produce such regulation forces and ways as necessary for actuating the throttling members, whereas more powerfully acting thermostats were not sensitive enough.

A practically utilizable control is rendered possible, however, by employing, instead of the valves as hitherto made use of, a slide or, a plurality of slides, preferably two, which are moved in opposite directions, and by actuating the slide or slides, not as formerly by a liquid-thermostat, but by a bi-metallic thermostat, as described hereinafter.

Throttling members controlled by such thermostats may be utilized for many purposes, such, for instance, as the regulation of the amount of a circulating fluid, for instance in a heating plant or in a distilling or cooling plant, especially in the cooling jackets of the cylinders of internal combustion engines, and the like.

Figure 1:
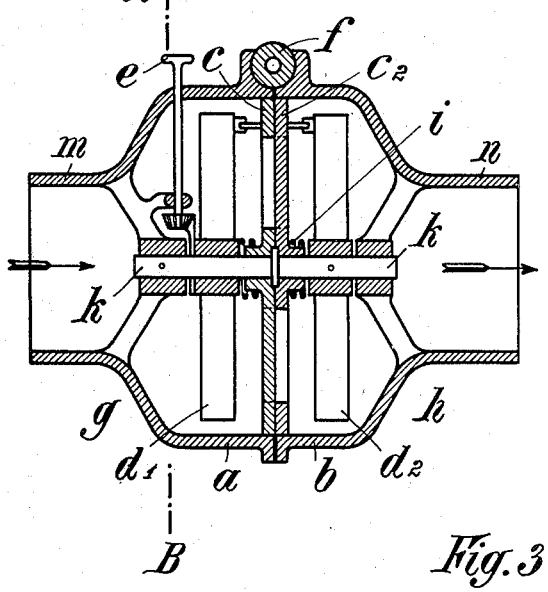
Figure 2:
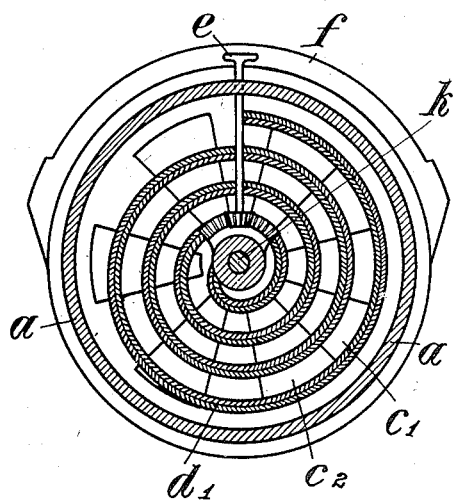
Figure 3:
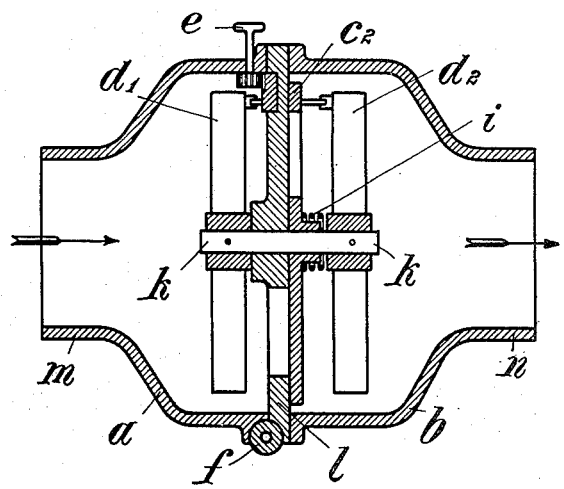

Two forms of construction of my improved device are shown, by way of example, in the accompanying drawing, in which Figure 1 is an axial section through one of then; Figure 2 is a sectional view taken on line A—A of Fig. 1, and Figure 3 is also an axial section and relates to a modified form of construction.

Referring to Figure 1, $a$ and $b$ are the respective halves of the casing of the device, and $c^1$ and $c^2$ are two rotary slides having each at least one cut-out portion, but preferably a plurality of such while $d^1$ and $d^2$ are two thermostatic expansion bodies. The fluid enters the device in the direction of the lefthand arrow, contacts with, and heats the expansion bodies, and leaves the casing at the opposite end.

There may be means for adjusting the rotary slides by hand from the outer side of the casing; and such means may be of any desired or suitable construction. $e$ indicates such a means in the example in question; permitting the regulation of the amount of fluid that passes through the device in a certain time and, thus, to regulate also the temperature for instance of the water discharged from an internal combustion engine or the like having the device attached to it. The regulation starts from determining by hand, by means of the device $e$, the initial position of the rotary slides, after which the regulation proper is automatically effected by the action of the thermostatic members upon the thus adjusted slides.

$f$ is a thermometer, which is located in a groove of the casing and is protected in and by that groove. It allows of watching the outlet temperature of the cooling fluid. $m$ and $n$ are branches of the casing and serve for connecting it on the one side with a cooling fluid pipe and on the other side with a radiator. These connections may be effected by short pieces of hose.

In the form of construction shown in Figure 1 the thermostatic expansion bodies $d^1$ and $d^2$ are attached to a centrally arranged axle $k$ carrying also the rotary slides $c^1$ and $c^2$. The latter are pressed against a central collar $h$ by spiral springs $g$ and $i$, of which $g$ is comparatively weak, whereas $i$ is comparatively strong. Each slide is capable of a short axial motion upon the common axle of the parts in question, that motion being bounded in the one direction by the collar $h$ and in the other direction by the associate expansion body.

If the pressure difference at the slides surpasses a certain limit as determined by the stronger spring $i$, the rear slide gives way and is moved off the collar $h$ whereby the cooling fluid is allowed to flow from the one side of the device to the other side without regard to the relative position of the cut-off edges of the slides as determined by the temperature, or by the position of the thermostats respectively.

The manner of operation is as follows:

The cooling fluid flows through the device in the direction indicated by the arrows and heats the thermostatic bodies which correspondingly expand and turn the slides in opposite directions so that their cut out portions coincide. If the temperature of the fluid decreases, the procedure is the reverse. But besides this automatic regulation of the amount of fluid, also regulation by hand is possible by means of the device $e$ which serves, however, chiefly for adjusting the rotary slides relative to one another at the beginning.

In the form of construction shown in Figure 3, the effects of the two thermostats are obtained by letting the one of them act upon the other and letting this latter thermostat act upon the rotary slide, there being only one such slide in this embodiment. Instead of the slide $c^1$ (Fig. 1), a stationary plate $l$ is used having passages like that slide. The plate or disk $l$ supports the axle or spindle $k$ which in its turn carries the thermostatic bodies $d^1$ and $d^2$. The motion which the body $d^1$ produces is transferred to the body $d^2$, that is to say, it is transferred also to the rotary slide $c^2$, but only by means of the body $d^2$; and the motion, however, which the body $d^2$ produces is transferred directly to the slide, the whole amount of motion transferred to the slide being, thus, the sum of the two single motions of the two thermostatic bodies. It is obvious that instead of only two thermostats, three or more may be arranged in series in the manner just described.

All operating parts operate automatically within the fluid. None of them are exposed to any outer influence and no slide axle extends outwards so that any disturbance by an outer cause is obviated.

Making use of rotary slides and of bi-metallic thermostats permits of a very compact construction of the device whereby it is made possible to insert it, for instance, into the existing hose-connection between the radiator and the cooling water conduit of an internal combustion engine or the like. The casing is, for that purpose, provided with branches $m$ and $n$.

Having now described my invention, what I desire to secure by a patent of the United States is:

1. A thermostatic throttling device comprising a casing; an axle mounted in said casing having a central collar; a rotary slide mounted on said axle and on each side of said collar; a bi-metallic thermostat mounted on said axle and adjacent each slide, said thermostats having connections to its respective slide; and a spiral spring between each thermostat and its respective slide so that said slides are forced against each other.

2. A thermostatic throttling device comprising a casing; an axle mounted in said casing; a slide mounted on said axle; a plurality of thermostats mounted on said axle and in the direct path of a fluid forced through said casing; a spiral spring between said slide and one of said thermostats; and means connecting one of said thermostats with said slide in order that the plurality of cooperating thermostats shall move said slide by variation of fluid temperature.

3. A thermostatic throttling device, comprising, in combination, two co-axially arranged rotary slides; a bi-metallic expansion-body on each side of said slides; separated motion-transmitting connections between the expansion bodies and the slides; means including an axle for supporting the slides and the bodies; and a casing enclosing the said parts.

4. A thermostatic throttling device, comprising, in combination, two co-axially arranged rotary slides located side by side; two bi-metallic expansion-bodies, of which one is located at the one side of said slides, the other at the other side; separated motion transmitting connections between the expansion bodies and the slides; means for supporting the slides and the bodies; and a casing enclosing the said parts.

5. A thermostatic throttling device, comprising, in combination, an axially displaceable rotary slide; an abutment for said slide; a spring so arranged as to be adapted to press the slide against said abutment; a bi-metallic expansion body; a motion-transmitting connection between said slide and said body; means for supporting the slide and the body; and a casing enclosing the said parts.

6. A thermostatic throttling device, comprising, in combination, a slide; a bi-metallic expansion-body; a motion-transmitting connection between said slide and said body; means for supporting the slide and the body; a casing enclosing the said parts and having an outer groove; and a thermometer in said groove, as set forth.

In testimony whereof I have affixed my signature.

WILHELM EBERHARD ERNST.